United States Patent [19]

Dahl et al.

[11] Patent Number: 5,585,333

[45] Date of Patent: Dec. 17, 1996

[54] HYDROCARBON BASE CEMENTITIOUS DRILLING FLUIDS AND METHODS

[75] Inventors: Jeffrey A. Dahl; E. Dwyann Dalrymple; Patty L. Totten; Alireza B. Rahimi, all of Duncan, Okla.

[73] Assignee: Halliburton Company, Duncan, Okla.

[21] Appl. No.: 321,696

[22] Filed: Oct. 12, 1994

[51] Int. Cl.$^6$ .................................................. C09K 7/00
[52] U.S. Cl. ......................... 507/103; 507/135; 507/140; 166/292; 166/293
[58] Field of Search ..................................... 507/103, 140, 507/135; 166/292, 293

[56] References Cited

U.S. PATENT DOCUMENTS

| | | | |
|---|---|---|---|
| 3,557,876 | 1/1971 | Tragesser | 166/292 |
| 3,849,316 | 11/1974 | Motley et al. | 507/140 |
| 5,058,679 | 10/1991 | Hale et al. | 166/293 |
| 5,121,795 | 6/1992 | Ewert et al. | 166/292 |
| 5,213,160 | 5/1993 | Nahm et al. | 507/140 |
| 5,295,543 | 3/1994 | Terry et al. | 166/293 |
| 5,305,831 | 4/1994 | Nahm | 166/293 |
| 5,327,968 | 7/1994 | Onan et al. | 166/293 |
| 5,343,952 | 9/1994 | Cowan et al. | 166/292 |
| 5,346,012 | 9/1994 | Heathman et al. | 166/293 |
| 5,370,185 | 12/1994 | Cowan et al. | 166/293 |
| 5,372,641 | 12/1994 | Carpenter | 507/140 |
| 5,382,290 | 1/1995 | Nahm et al. | 507/140 |
| 5,476,144 | 12/1995 | Nahm et al. | 166/293 |

FOREIGN PATENT DOCUMENTS 91306469.7  7/1991  European Pat. Off. .

OTHER PUBLICATIONS

SPE Paper No. 20452 entitled "*Conversion of Mud to Cement*" by W. N. Wilson, R. B. Carpenter and R. D. Bradshaw, ARCO Oil & Gas Co., presented at the 65th Annual Technical Conference and Exhibition of the Society of Petroleum Engineers held in New Orleans, Louisiana, Sep. 23–26, 1990.

SPE paper No. 24575 entitled "*Conversion of Drilling Fluids to Cements with Blast Furnace Slag: Performance Properties and Applications for Well Cementing*" By K. M. Cowan; A. H. Hale and J. J. Nahm, Shell Development Co., presented at the 67th Annual Technical Conference and Exhibition of the Petroleum Engineers held in Washington, D.C. Oct. 4–7, 1992.

*Primary Examiner*—Philip Tucker
*Attorney, Agent, or Firm*—Craig W. Roddy; C. Clark Dougherty, Jr.

[57] ABSTRACT

Hydrocarbon base drilling fluids which are selectively convertible to cementitious compositions that set into hard substantially impermeable masses and methods of using such drilling fluids are provided. The drilling fluids are basically comprised of a hydrocarbon liquid having particulate hydraulic cement suspended therein. The drilling fluids are converted to cementitious compositions by admixing water and a surfactant therewith.

18 Claims, No Drawings

HYDROCARBON BASE CEMENTITIOUS DRILLING FLUIDS AND METHODS

BACKGROUND OF THE INVENTION

1. Field of the Invention

The present invention relates generally to hydrocarbon base cementitious drilling fluids and methods, and more particularly, to hydrocarbon base drilling fluids which are selectively convertible to cementitious compositions that set into hard substantially impermeable masses.

2. Description of the Prior Art

A variety of drilling fluids are used in drilling well bores by the rotary drilling method. The most commonly utilized such drilling fluids are solids containing water base gels. However, when the well bores to be drilled penetrate water sensitive formations, hydrocarbon base drilling fluids are utilized.

After a well bore is drilled during which the drilling fluid used is circulated through the well bore, the circulation of the drilling fluid is stopped and the well is usually logged after which a string of pipe, e.g., casing, is run into the well bore. The drilling fluid is cleaned up by circulating it downwardly through the interior of the pipe and upwardly through the annulus between the exterior of the pipe and the walls of the well bore while removing drilling solids and gas therefrom. Primary cementing operations are then performed in the well bore, i.e., the string of pipe disposed in the well bore is cemented therein by placing a cementing composition in the annulus between the pipe and the walls of the well bore. The cementing composition sets into a hard substantially impermeable mass whereby the pipe is bonded to the walls of the well bore and the annulus is sealed. When the cementing composition is run down the pipe and into the annulus, the drilling fluid in the pipe and annulus is displaced therefrom. The used drilling fluid is generally accumulated in a pit or tank and then disposed of.

The disposal of drilling fluid is time consuming and expensive, particularly in offshore drilling locations. In recent years, the expense has increased significantly in that drilling fluid often must be disposed of as a fluid which is hazardous to the environment. Thus, any environmentally safe use to which all or part of the drilling fluid can be put at a well site is highly advantageous in that it eliminates the need for subsequently disposing of all or part of the drilling fluid.

By the present invention, hydrocarbon base drilling fluids and methods of drilling well bores utilizing the drilling fluids and subsequently disposing of the drilling fluids by converting them to cementitious compositions are provided. The converted cementitious drilling fluid compositions can be used for carrying out cementing operations in the well bore, and any remaining portion thereof can be placed in an environmentally safe location wherein the drilling fluid composition sets into a hard cementitious mass.

SUMMARY OF THE INVENTION

The present invention provides hydrocarbon base drilling fluids which are selectively convertible to cementitious compositions which set into hard substantially impermeable masses. The drilling fluids are basically comprised of a relatively low viscosity and non-volatile hydrocarbon liquid having particulate hydraulic cement suspended therein in an amount in the range of from about 1 part by weight to about 4.3 parts by weight of cement per 1 part by weight of hydrocarbon liquid.

The present invention also provides methods of drilling well bores utilizing the hydrocarbon base cementitious drilling fluids of this invention and subsequently disposing of the drilling fluids. The methods basically comprise the steps of forming a hydrocarbon base cementitious drilling fluid, drilling a well bore using the drilling fluid, converting the drilling fluid into a cementitious composition which sets into a hard substantially impermeable mass by admixing therewith water and a surfactant for promoting contact between the water and hydraulic cement in the drilling fluid, and then placing the resulting cementitious composition in at least one location whereby it sets into a hard environmentally safe cementitious mass therein.

It is, therefore, a general object of the present invention to provide hydrocarbon base cementitious drilling fluids and methods.

Other and further objects, features and advantages of the present invention will be readily apparent to those skilled in the art upon a reading of the description of preferred embodiments which follows.

DESCRIPTION OF PREFERRED EMBODIMENTS

Well bores are most commonly drilled using a rotary drill bit connected to a string of drill pipe. The drill pipe and bit are rotated, and a drilling fluid, generally a water base gel or a hydrocarbon base fluid with or without weighting material suspended therein, is circulated downwardly through the drill pipe, through ports in the drill bit and then upwardly through the annulus between the drill pipe and the walls of the well bore to the surface. While drilling fluids comprised of water base gels are most commonly utilized, when the subterranean formations through which a well bore is to be drilled contain water swellable clays or are otherwise water sensitive, a hydrocarbon base drilling fluid is utilized. An example of a heretofore used hydrocarbon base drilling fluid is an inverted oil-water emulsion (oil external phase-water internal phase). Such an emulsion drilling fluid usually includes an emulsifying surfactant, weighting material and a gelling agent.

The drilling fluid carries cuttings produced by the drill bit to the surface which are separated from the drilling fluid as is any gas therein. A reservoir of circulating drilling fluid is maintained on the surface, and the drilling fluid is pumped from the reservoir by circulating pumps back into the drill string. When the well bore has reached its desired depth, the drilling and the circulation of drilling fluid are stopped, the drill pipe and bit are removed from the well bore, subterranean formations penetrated by the well bore are usually logged and pipe to be cemented in the well bore is run therein.

After the pipe to be cemented has been run in the well bore, a primary cementing operation is carried out whereby the drilling fluid in the well bore is displaced out of the well bore by a cement slurry which is pumped downwardly through the pipe and upwardly into the annulus between the pipe and the walls of the well bore. The cement slurry hardens into a substantially impermeable solid mass in the annulus which bonds the pipe to the walls of the well bore and seals the annulus whereby formation fluids are prevented from flowing into the annulus between subterranean zones penetrated by the well bore and/or to the surface.

As mentioned above, the used drilling fluid which is displaced from the well bore during primary cementing usually must be disposed of as a hazardous fluid under environmental protection laws. Such disposal of the drilling fluid, particularly a hydrocarbon base drilling fluid, is time consuming and expensive, especially at offshore drilling locations where the used drilling fluid must be displaced into a tanker, transported to shore, unloaded and disposed of on shore in an environmentally safe manner.

The present invention provides hydrocarbon base drilling fluids which are selectively convertible to cementitious compositions that set into hard substantially impermeable masses, and methods of utilizing such drilling fluids for drilling a well bore and if desired, for carrying out cementing operations in the well bore. The cementitious drilling fluid that remains after a well bore is drilled and optionally cemented therewith can be easily disposed of in an environmentally safe manner by placing it in a desired location and permitting it to set into a hard substantially impermeable mass therein.

The hydrocarbon base cementitious drilling fluids of this invention are basically comprised of a relatively low viscosity non-volatile hydrocarbon liquid having particulate hydraulic cement suspended therein in an amount in the range of from about 1 part by weight to about 4.3 parts by weight of cement per 1 part by weight of hydrocarbon liquid.

A variety of relatively low viscosity and non-volatile hydrocarbon liquids can be utilized for forming the drilling fluids of this invention. For example, the hydrocarbon liquid can be an aliphatic compound such as hexane, heptane or octane, an aromatic compound such as benzene, toluene or xylene, mixtures of aliphatic and aromatic compounds such as kerosene, diesel oil, mineral oil and lubricating oil, poly α-olefin oils and ester and ether based oils. Generally, a hydrocarbon liquid selected from the group consisting of kerosene, diesel oil, mineral oil and lubricating oil is preferred with diesel oil being the most preferred.

Various hydraulic cementitious materials can also be utilized in the drilling fluids such as Portland cement, high alumina cement, Portland cement and slag, slag activated with a suitable alkali activator, e.g., soda ash and/or caustic, fly ash of the ASTM Class F type with lime, fly ash of the ASTM Class C type, condensed silica fume with lime, gypsum cement (calcium sulfate hemihydrate) and mixtures of such cementitious materials. Of these, Portland cement and mixtures of Portland cement and slag are preferred with Portland cement being the most preferred.

While particulate hydraulic cements having various particle sizes can be utilized in accordance with this invention, fine particle size Portland cement is generally preferred, e.g., Portland cement having particles of diameters no greater than about 30 microns and having a Blaine Fineness no less than about 6000 square centimeters per gram. Fine particle size Portland cement is disclosed in U.S. Pat. No. 4,160,674 issued on Jul. 10, 1979 to Sawyer. Methods of utilizing such fine particle size Portland cement in well cementing are described in U.S. Pat. No. 5,086,850 entitled "Squeeze Cementing" issued on Jul. 16, 1992 and U.S. Pat. No. 5,125,455 entitled "Primary Cementing" issued on Jun. 30, 1992, which patents are incorporated herein by reference thereto.

The fine particle size Portland cement used in accordance with this invention is preferably made up of particles having diameters no larger than about 30 microns, more preferably no larger than about 17 microns and still more preferably no larger than about 11 microns. The distribution of various sized particles within the cementitious materials is preferably such that 90% of the particles have a diameter no greater than about 25 microns, more preferably about 10 microns and still more preferably about 7 microns, 50% of the particles have a diameter no greater than about 10 microns, more preferably about 6 microns and still more preferably about 4 microns, and 20% of the particles have a diameter no greater than about 5 microns, more preferably about 3 microns and still more preferably about 2 microns. The Blaine Fineness of the particles is preferably no less than about 6000 square centimeters per gram. More preferably, the Blaine Fineness is no less than about 7000, still more preferably about 10,000 and most preferably no less than about 13,000 square centimeters per gram.

As will be understood by those skilled in the art, the drilling fluids of this invention can optionally contain various known additives in admixture therewith including fluid loss control additives, viscosifiers, dispersants, surfactants and weighting materials. Appropriate additives are utilized to provide a drilling fluid with the required properties for the particular well bore to be drilled including fluid loss control properties, density, solid suspension properties, etc. The hydrocarbon base drilling fluids of this invention can have densities up to about 15 pounds per gallon and yield points in the range of from about 5 to about 80 foot-pounds per 100 square feet.

The hydrocarbon base drilling fluids of this invention can be selectively converted to cementitious compositions which set into hard substantially impermeable masses by admixing therewith water and a surfactant which promotes contact between the water and the particulate hydraulic cement in the drilling fluid. Prior to being converted to a cementitious composition, the particulate hydraulic cement in the drilling fluid is coated with hydrocarbon liquid, and as a result, the drilling fluid can tolerate the low levels of water contamination experienced during drilling. When converted, the surfactant admixed with the drilling fluid along with water strips the hydrocarbon coating from the cement particles which allows the cement particles to chemically react with the water and undergo hydration. As will be understood, additional additives can be added to the drilling fluid when it is converted to impart desired properties to the resulting cementitious composition. Examples of such additives are set delaying additives, additives to prevent compressive strength retrogression and the like.

Particularly suitable surface active agents for use in accordance with this invention are aromatic sulfonic acids and salts. Preferably, the surface active agent is selected from the group consisting of an aromatic sulfonic acid having the formula

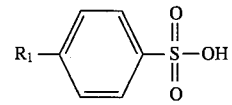

wherein $R_1$ is a linear alkyl group having 12 carbon atoms or a linear alkyl group having from 16 to 24 carbon atoms, an aromatic sulfonic acid having the formula

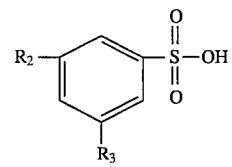

wherein $R_2$ and $R_3$ are linear alkyl groups having 12 carbon atoms, and the alkali and alkaline earth metal salts of the foregoing acids. The most preferred surface active agents of the type described above for use in accordance with this invention are one or more selected from the group consisting of dodecylbenzene sulfonic acid and the alkali metal salts thereof.

As mentioned above, when it is desired to convert a hydrocarbon base drilling fluid of this invention to a cementitious composition which sets into a hard substantially impermeable mass, water and a surfactant of the type described above is admixed with the drilling fluid. Generally, the water is admixed with drilling fluid in an amount in the range of from about 20% to about 175% by weight of particulate hydraulic cement in the drilling fluid. The surface active agent used is admixed with the drilling fluid in an amount in the range of from about 0.015 gallon to about 0.03 gallon of surfactant per gallon of hydrocarbon liquid in the drilling fluid.

For ease of mixing, the surface active agent can be dissolved in a low molecular weight alcohol such as an aliphatic alcohol having in the range of from 1 to about 5 carbon atoms. Isopropanol is a particularly preferred such alcohol, and the aromatic sulfonic acid or sulfonate utilized is preferably dissolved in the alcohol in an amount in the range of from about 60 to about 80 parts per 100 parts by volume of solution.

The methods of this invention for drilling a well bore utilizing a hydrocarbon base drilling fluid and subsequently disposing of the drilling fluid are basically comprised of the following steps. A hydrocarbon base drilling fluid comprised of a relatively low viscosity and non-volatile hydrocarbon liquid having particulate hydraulic cement suspended therein is formed. The hydraulic cement is included in the drilling fluid in an amount in the range of from about 1 part by weight to about 4.3 parts by weight of cement per 1 part by weight of hydrocarbon liquid.

After forming the drilling fluid, it is utilized in the usual manner for drilling a well bore. Upon completion of the well bore, the drilling fluid is converted into a cementitious composition which sets into a hard substantially impermeable mass by admixing therewith water and a surfactant of the type described above for promoting contact between the water and the hydraulic cement in the drilling fluid. The resulting cementitious composition is disposed of by placing it in one or more desired locations whereby it sets into a hard environmentally safe cementitious mass or masses therein.

One of the above mentioned locations can be a location in the well bore. That is, a part of the converted cementitious drilling fluid can be utilized for carrying out well bore cementing operations such as primary cementing. The remaining drilling fluid, or all of the drilling fluid if a portion of it is not used for primary cementing or other cementing at the well site can be transported to a location remote from the well site, converted to a cementitious composition, and placed in an above-ground or below-ground location whereby it sets into a hard environmentally safe cementitious mass therein.

When the drilling fluid is converted, the mixing of the water and surface active agent with all or a portion of the drilling fluid can be accomplished by installing an in-line mixing device in the drilling fluid line downstream of the drilling rig solids removal equipment and upstream of the Kelly hose. As the drilling fluid is circulated through the line, the in-line mixing device is utilized for injecting the required volumes of water and surface active agent into the drilling fluid. The turbulence imparted by the in-line mixer causes the water and surface active agent to be blended with the drilling fluid and enables the surface active agent to strip the hydrocarbon liquid coating from the cement particles, etc. Alternatively, a pump truck having pumps and a mixer mounted thereon can be utilized for admixing the water and surface active agent with the drilling fluid as the drilling fluid is being circulated.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of drilling a well bore utilizing a hydrocarbon base drilling fluid and subsequently disposing of the drilling fluid comprising the steps of:

(a) forming a hydrocarbon base drilling fluid comprised of a relatively low viscosity and non-volatile hydrocarbon liquid having particulate hydraulic cement suspended therein, said hydraulic cement being present in an amount in the range of from about 1 part by weight to about 4.3 parts by weight of cement per 1 part by weight of hydrocarbon liquid in said drilling fluid;

(b) drilling said well bore using said drilling fluid;

(c) converting said drilling fluid into a cementitious composition which sets into a hard substantially impermeable mass by admixing water and a surfactant for promoting contact between said water and said hydraulic cement therewith; and (d) placing said cementitious composition in one or more desired locations whereby it sets into hard environmentally safe cementitious masses therein.

2. The method of claim 1 wherein said hydrocarbon liquid is selected from the group consisting of kerosene, diesel oil, mineral oil and lubricating oil, poly α-olefin oils and ester and ether based oils.

3. The method of claim 1 wherein said hydraulic cement is a fine particle size cement.

4. The method of claim 1 wherein said cement is fine particle size Portland cement or a mixture of slag and fine particle size Portland cement wherein said Portland cement has a particle size no greater than about 30 microns and a Blaine Fineness no less than about 6000 square centimeters per gram.

5. The method of claim 1 wherein said water is admixed with said drilling fluid in accordance with step (c) in an amount in the range of from about 20% to about 175% by weight of hydraulic cement in said drilling fluid.

6. The method of claim 1 wherein said surfactant admixed with said drilling fluid in accordance with step (c) is selected from the group consisting of:

an aromatic sulfonic acid having the formula

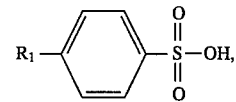

an aromatic sulfonic acid having the formula

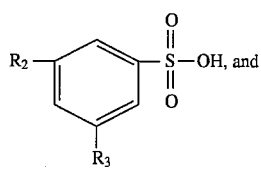

the alkali and alkaline earth metal salts of the foregoing acids, wherein $R_1$ is a linear alkyl group having 12 carbon atoms or a linear alkyl group having from 16 to 24 carbon atoms and $R_2$ and $R_3$ are linear alkyl groups having 12 carbon atoms.

7. The method of claim 6 wherein said surfactant is selected from the group consisting of dodecylbenzene sulfonic acid and the alkali metal salts thereof.

8. The method of claim 6 wherein said surfactant is admixed with said drilling fluid in an amount in the range of from about 0.015 gallon to about 0.03 gallon of surfactant per gallon of hydrocarbon liquid in said drilling fluid.

9. The method of claim 8 wherein said surfactant is admixed with said drilling fluid in the form of an alcohol solution containing said surfactant, said alcohol being selected from the group consisting of aliphatic alcohols having in the range of from 1 to about 5 carbon atoms.

10. The method of claim 9 wherein said surfactant is dodecylbenzene sulfonic acid and said alcohol solvent is isopropanol.

11. The method of claim 1 wherein at least a part of said cementitious composition is placed in accordance with step (d) in the annulus between a pipe disposed in said well bore and the walls of said well bore.

12. A method of drilling a well bore utilizing a hydrocarbon base drilling fluid comprising the steps of:

(a) forming a hydrocarbon base drilling fluid comprised of a hydrocarbon liquid selected from the group consisting of kerosene, diesel oil, mineral oil and lubricating oil having fine particle size Portland cement suspended therein, said hydraulic cement being present in an amount in the range of from about 1 part by weight to about 4.3 parts by weight of cement per 1 part by weight of hydrocarbon liquid in said drilling fluid;

(b) drilling said well bore using said drilling fluid;

(c) converting at least a part of said drilling fluid into a cementitious composition which sets into a hard substantially impermeable mass by admixing water and a surfactant selected from the group consisting of dodecylbenzene sulfonic acid and the alkali metal salts thereof therewith; and (d) placing said cementitious composition in the annulus between a pipe disposed in said well bore and the walls of said well bore.

13. The method of claim 12 wherein said hydrocarbon liquid is diesel oil.

14. The method of claim 13 wherein said fine particle size Portland cement has particles of a diameter no greater than about 17 microns and a Blaine fineness no less than about 10,000 square centimeters per gram.

15. The method of claim 14 wherein said water is admixed with said drilling fluid in accordance with step (c) in an amount in the range of from about 20% to about 175% by weight of hydraulic cement in said drilling fluid.

16. The method of claim 15 wherein said surfactant is admixed with said drilling fluid in an amount in the range of from about 0.015 gallon to about 0.03 gallon of surfactant per gallon of hydrocarbon liquid in said drilling fluid.

17. The method of claim 16 wherein said surfactant is mixed with said drilling fluid in the form of an alcohol solution containing said surfactant, said alcohol being selected from the group consisting of aliphatic alcohols having in the range of from 1 to about 5 carbon atoms.

18. The method of claim 17 wherein said surfactant is dodecylbenzene sulfonic acid and said alcohol solvent is isopropanol.

\* \* \* \* \*